J. WATERHOUSE.

Gas Purifier.

No. 21,096.

Patented Aug. 3, 1858.

UNITED STATES PATENT OFFICE.

JNO. WATERHOUSE, OF LITTLE FALLS, NEW YORK.

APPARATUS FOR PURIFYING GAS.

Specification of Letters Patent No. 21,096, dated August 3, 1858.

*To all whom it may concern:*

Be it known that I, JOHN WATERHOUSE, of Little Falls, in the county of Herkimer and State of New York, have invented certain new and useful Improvements in Gas-Purifiers; and I do hereby declare the following to be a full, clear, and exact description of the same, reference being had to the accompanying drawings, making a part of this specification, in which—

Figure 2:
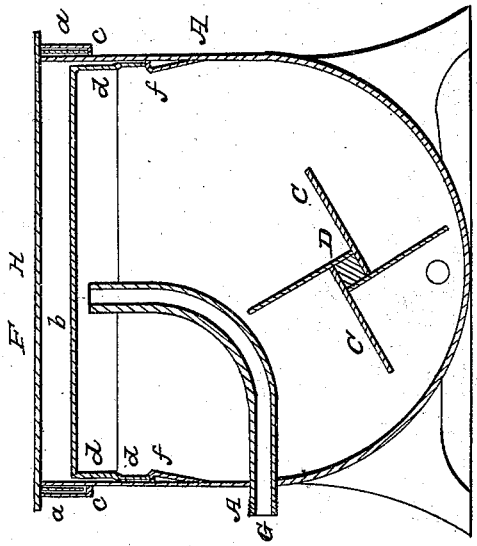
Figure 3:
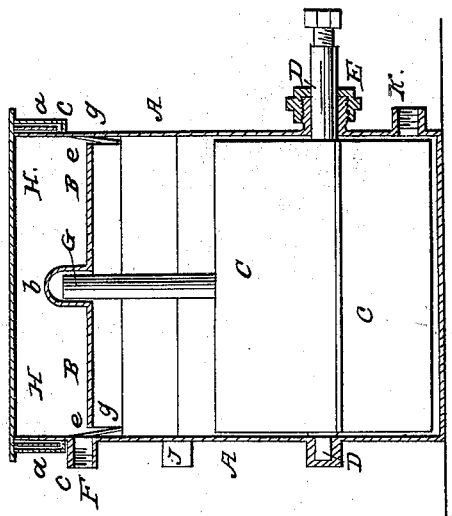
Figure 1:
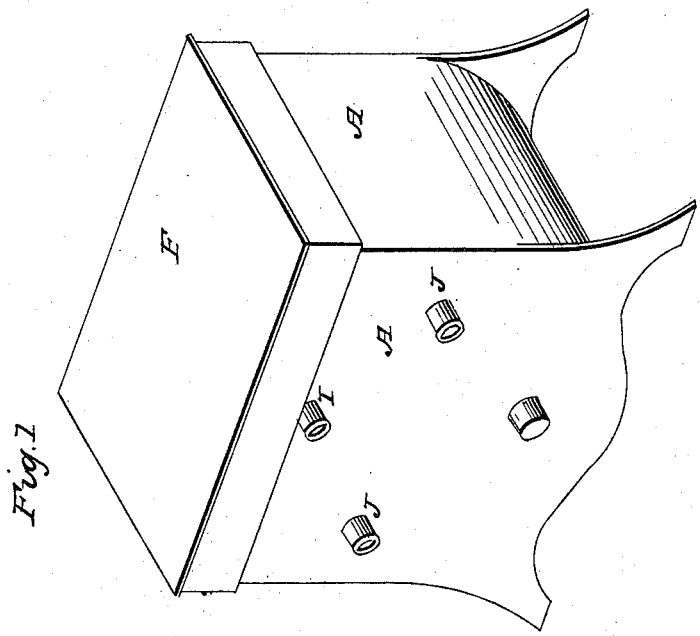

Figure 1 represents a perspective view of the purifier. Fig. 2 represents a vertical longitudinal, and Fig. 3, a vertical transverse section through the same.

Similar letters of reference where they occur in the separate figures denote like parts of the apparatus in all of them.

It is known that, milk of lime, or lime-water purifiers, as contradistinguished from dry lime purifiers, effect a great saving in the quantity of lime used in purifying gas. But owing to the pressure in lime-water purifiers, which has an injurious effect upon the retorts, they have been superseded.

My object is to avail myself of the superior qualities of the lime-water as a purifier and to obviate the deposits on the interior of the retort, caused by the pressure in the lime water purifier, by removing that pressure in a very great degree, and the nature of my invention consists in introducing the gas to be purified underneath a table or its equivalent at a less distance below the surface of the lime water than heretofore and then causing it to travel through the lime water at this shallow depth, a distance sufficient to bring every particle of it in contact with the lime water and thus be separated from all its injurious properties, before it escapes into the open chamber above the liquid.

To enable others skilled in the art to make and use my invention, I will proceed to describe the same with reference to the drawings.

The pressure of liquids, is in proportion to the height of the column, and not its superficial area, and heretofore, gas that was to be purified in the liquid lime, was necessarily introduced far enough below the head of the column of water, to insure its coming in contact with the lime before it arose to the surface, and this effected such a pressure in the retorts, as to cause a carbonaceous deposit on the inner surface of the retorts, which very soon ruined them, by either causing them to crack or burn out. I get the necessary extent of distance through the lime water, but at a reduced head, and consequently at a reduced pressure, which not only increases the quantity of gas from a given product, because it does not deposit in crude carbonaceous matter on the interior of the retort, but also makes great economy, in preserving the retorts themselves from the injurious effects of this deposit.

A, represents a metallic case or vessel in which the purification of the gas is effected. This vessel is filled with milk of lime or lime water of the proper consistency, up to a line just above the table B; and in the bottom of the vessel there is an agitator C, the shaft D of which passes through the case A, in a packed box or bearing E, and may be furnished with a crank or pulley by which it may be rotated, the object being to agitate and throw up the fresh lime water toward the surface where the gas passes through it. The shape of the table is readily seen in the section Fig. 3.

F, is the cover of the case or vessel, and is sealed or made tight, by the edges $a$ thereof passing into the grooves $c$, which are filled with water.

The gas enters the purifier through the pipe G, the interior end of which is under the long dome $b$, of the table B. The table has flanges $d$, $d$, at its ends which extend down into the lime water far enough to prevent the gas from escaping at the ends of the long dome $b$. The table is about two inches below the surface of the lime water, and the gas is introduced underneath the table, which however is very thin. The gas cannot escape into the chamber H above the table without first passing laterally underneath the table to its edges, and then it rises through the thin sheet of liquid lime over it, into the chamber H having been deprived of all its impurities by passing through the lime water from $b$, to the edges $c$ of the table, in a horizontal, or nearly so, direction, and I thus get the necessary distance that the gas should pass through the milk of lime to thoroughly purify it, without the pressure that would be on it if it were to rise vertically through the lime water the requisite distance to effect the same purification. I can effect the same results under a two inch head by my plan, or probably less than two inches, that is effected under the former plans by a 12 inch head or upward. From the best data which I can obtain, I estimate the ordinary pressure in lime water purifiers as equal to a column of water (varying in different establishments) from 24 to 36 inches. With dry limes, it is equal to about 16 inches, while with my improvement the pressure can be brought down to about 5 inches.

I, is the pipe through which the purified gas passes to the gasometer.

J, J, are supply pipes, and K, a draw-off pipe for cleaning the vessel of the spent lime water.

f, f, are supports for the table to rest upon, and g, g, guides to keep the edges of the table at suitable distances from the case to allow the gas to rise up at said edges.

Having thus fully described the nature and object of my invention, what I claim as new and desire to secure by Letters Patent is—

Introducing the gas into the purifier underneath a table or its equivalent near the surface of the lime water, so that it (the gas) shall pass horizontally through the lime water a sufficient distance to effect its purification before it can rise to the chamber above as set forth, by which means I obviate much of the pressure heretofore encountered in lime water purifiers, and get a better yield, at a great saving of retorts as herein stated.

JOHN WATERHOUSE.

Witnesses:
ABRAM B. WRIGHT,
WELFORD GRAY.